United States Patent Office 3,238,078
Patented Mar. 1, 1966

3,238,078
METHOD OF MAKING LAMINATES
AND MOLDED ARTICLES
John H. Baldwin, Watchung, N.J., assignor to Johns-Manville Corporation, New York, N.Y., a corporation of New York
No Drawing. Filed Aug. 18, 1961, Ser. No. 132,290
3 Claims. (Cl. 156—87)

This invention relates to a new method of pressing laminates and molded articles. More particularly, this invention relates to a novel method utilizing a new caul structure for pressing laminates thicker than heretofore possible without the disadvantages normally associated with the increased thickness. The invention finds particular use in laminating resins, including reinforced or filled resins, such as the silicones which, during polymerization, give off volatile matter. New silicone-asbestos laminates produced in accordance with the invention find particular application in the transformer and motor industries.

HISTORY

Because of the particular curing characteristics of certain resinous materials, various undesirable limitations have been necessitated with regard to the laminating procedures employing these resins. Particularly concerned are the silicone and phenolic resins which polymerize through a condensation mechanism and accordingly release volatile materials during the cure. These gases must be completely or substantially completely removed before use at elevated temperatures or delamination and blistering of the laminate will occur.

The normal processes for pressing and curing resinous structures involve the use of metal or other similar plate structures, such as caul plates, between the laminate and the press surfaces. However, the caul plates, because of their solid structure, entrap the volatile materials within the laminate and have necessitated expensive and time consuming postcuring operations to remove these materials. Many attempts have been made to overcome the expensive post treatment.

For instance, it has been suggested that longer pressing cycles be employed to obtain a more complete cure. However, the entrapped volatiles still remain and cause delamination during the post treatment. It has been further suggested that additional curing agents be employed for the same purpose with the result that the volatiles continue to cause the same problem. It has also been suggested that the pressure be relieved while the laminate is still hot, but blisters continue to develop because of the low, hot-laminar strength. While higher pressing temperature has also been suggested to further the cure, this does not alleviate the problem and is often uneconomical.

It is specifically due to these limitations on the pressing technique that it has heretofore been impractical to produce certain resinous laminates greater than $\frac{1}{16}$ inch in thickness. This is so because the pressure developed within a laminate exceeds the interlaminate strength when laminates greater than that thickness are postbaked in an economical period, consequently, the aforediscussed difficulties have ensued.

Moreover, expenses increase when metal caul plates are used because of damaging distortions which gradually develop both from cleaning and handling of the plates and from the effects of uneven densities within the laminated materials. The useful life of the caul plates is consequently shortened.

OBJECTS

It is therefore a principal object of this invention to provide a new method of laminating whereby the foregoing disadvantages are overcome.

It is another object of this invention to provide a novel method of laminating whereby the need for a post cure may be eliminated or if not completely eliminated, at least reduced a substantial amount.

It is another object of this invention to provide a new method of producing heretofore unobtainable laminates at such temperatures as to effect a complete cure of the material without any harmful effects to the article.

It is another object of this invention to provide a new method of producing laminates whereby laminates greater than $\frac{1}{16}$ inch in thickness may be produced in a one press operation without any deleterious effects.

It is another object of this invention to provide a new laminate structure economically produced and possessed of attractive physical properties.

Other objects and further scope of applicability of the present invention will become apparent from the detailed description given hereinafter.

BRIEF DESCRIPTION OF THE INVENTION

It has been discovered that the foregoing objects may be satisfied by providing a new laminating method wherein the solid metal caul plate is replaced by a porous absorptive pad-like structure, that is, employing a porous pad adjacent the laminate during pressing. It has been discovered that when such a structure is utilized during pressing, the volatiles are permitted to leave the laminate and escape through the pad. Utilizing the invention, higher temperatures and pressures may be employed in the initial cure thereby overcoming the above-mentioned disadvantages and lessening the post cure.

It has further been discovered that while the porous structure functions exceptionally well during pressing, such pads do not at all times release from the laminate after pressing. Accordingly, a second feature of the invention involves the use of a layer of material of high internal strength, such as glass cloth, as a release agent for the pad. The product of the invention is characterized by thicknesses and electrical properties heretofore unobtainable.

DETAILED DESCRIPTION OF THE INVENTION

A more complete understanding of the invention may be obtained by reference to the following examples of operations within the scope of this invention. In these examples all parts and percentages are by weight unless otherwise indicated.

Square laminates dimensioned one foot on a side and ranging from $\frac{1}{32}$ to $\frac{3}{8}$ inch thick, were prepared from a high bulk asbestos paper and a commercially available silicone laminating resin. By high bulk asbestos paper, it is meant a paper consisting essentially of asbestos and having a bulk of at least 0.30, bulk being defined as the caliper (thickness) in inches times 100 divided by weight in pounds per 100 square feet of paper. This paper is similar to that described in the copending U.S. Letters Patent application Serial No. 55,924, filed October 6, 1960, but as used herein, contained no resin binder. The particular silicone resin used was Union Carbide's R-640 silicone resin which is available as a 65 percent solids material. The resin was diluted to 35 percent solids with toluene. One percent of catalyst was used based on the weight of the solids. The paper was saturated by float saturation to 41 percent resin content, and subsequently dried for three minutes at 200–290° F. in heated air towers.

EXAMPLES I, II, III, IV AND V

To make the laminates, sheets of the saturated paper were pressed for two hours at 1000 p.s.i. and 350° F. and then released cold. In preparing single laminates the proper number of saturated sheets were combined, the number depending on the desired thickness, and the requisite amount is listed below in Table 1. To each side of the paper was applied a sheet of No. 116 standard glass cloth. To the outside of each glass cloth was applied the porous pads composed of asbestos sheets. Here too the number of sheets needed to make an operable press varied, dependent on the thickness of the laminate and these are also listed in Table 1. Aluminum foil was applied to the outside of the porous pad. The sandwich structures were pressed.

*Table 1*

| Example | Laminate thickness, inch | Silicone paper, number of plies | No. of sheets per side, 15 mil No. 3000 "Quinorgo"* paper |
|---|---|---|---|
| I | 1/32 | 6 | 4 |
| II | 1/16 | 11 | 5 |
| III | 1/8 | 23 | 6 |
| IV | 1/4 | 47 | 7 |
| V | 3/8 | 72 | 8 |

*An asbestos paper marketed by Johns-Manville Sales Corporation.

EXAMPLES VI, VII AND VIII

Multiple laminate combinations were tried, using for the runs three laminates 1/16 inch thick, two 1/8 inch thick, and one containing both an 1/8 inch and a 1/4 inch laminate. The procedure was similar to that mentioned above regarding Examples I to V, using intermittent pads and cloth, in accordance with the formula in Table 2, below, dependent on the thickness of the adjacent laminates.

*Table 2*

NUMBER OF SHEETS 15 MIL NO. 3000 "QUINORGO" PAPER BETWEEN ADJACENT LAMINATES

| Laminate thickness, inch | 1/32 | 1/16 | 1/8 | 1/4 | 3/8 |
|---|---|---|---|---|---|
| 1/32 | 6 | 7 | 8 | 8 | 9 |
| 1/16 | 7 | 8 | 9 | 9 | 10 |
| 1/8 | 8 | 9 | 9 | 10 | 11 |
| 1/4 | 8 | 9 | 10 | 10 | 11 |
| 3/8 | 9 | 10 | 11 | 11 | 12 |

Because of the low press temperature used, the laminates did require some post cure. The electrical and physical properties of the 1/8-inch laminate are listed below in Table 3.

*Table 3*

ELECTRICAL AND PHYSICAL PROPERTIES OF UNION CARBIDE R-640 SILICONE HIGH-BULK ASBESTOS LAMINATE

| Electrical properties | Test results, post cured |
|---|---|
| Dielectric strength, Parallel kv.: | |
| Std. cond.— | |
| Rapid rise | 47 |
| Step wise | 58 |
| Warm humid— | |
| Rapid rise | 26 |
| Step rise | 25 |
| Perpendicular, VPM, 1/16 inch | *530 |
| Parallel insulation resistance, megohms: | |
| Std. cond | 250,000 |
| Warm humid | 19,000 |
| PHYSICAL PROPERTIES | |
| Flexural strength, p.s.i.: | |
| Machine direction | 25,000 |
| Cross machine direction | 22,500 |

*Pressed by regular method without absorptive pads and only 1/16-inch thick.

It is most significant to note that heretofore it was impossible to obtain silicone impregnated laminates of a thickness greater than 1/16 inch possessed of such good properties. Particularly significant are the electrical properties, such as dielectric strength, measured in accordance with the standard NEMA (National Electrical Manufacturers Association) test, ASTM D-709. As evidenced above, the parallel dielectric strength at warm humid conditions was 26 kv. It is belived that prior to this invention it was impossible to obtain readings greater than 5-10 kv. for manufactured products. Moreover, the instant product is so novel that comparison with a conventional specification is not possible as there is none. It has been found that the instant product is particularly suited as a class H insulation, since it is capable of withstanding continuous service at temperatures in excess of 180° C.

Similarly, the parallel insulation resistance, measured by ASTM D-229, for warm humid conditions far exceeds the maximum of 10,000 megohms heretofore believed possible to attain.

Laminates up to four square feet in area, ranging from 1/32 to 1/2 inch thick, were prepared from the same high bulk asbestos paper and another commercially available silicone laminating resin. The particular resin used was Dow Corning's DC 2104 silicone resin which is available as a 60 percent solids material. The resin was diluted to 44 percent solids with toluene. No catalyst was used since DC 2104 will cure at elevated temperatures in the presence of asbestos, and catalyzed DC 2104 has limited pot life. The paper was saturated by float saturation to 45–50 percent resin content and subsequently dried for three minutes at 250° F. in heated air towers.

EXAMPLE IX

To make the laminates, sheets of saturated paper were pressed for two hours at 1000 p.s.i. and 575° F. and then released cold. Preparation of single laminates for pressing followed exactly the preparation described above for Examples I to V.

EXAMPLES X AND XI

Multiple laminates were tried using for the runs two laminates, 1/16 inch thick and again two laminates 1/16 inch thick. Preparation of multiple laminates for pressing followed the preparation described for multiple laminates in Examples VI to VIII.

Electrical and physical properties of a 1/16 inch thick laminate are given below in Table 4.

*Table 4*

ELECTRICAL AND PHYSICAL PROPERTIES OF DOW CORNING 2104 SILICONE HIGH-BULK ASBESTOS LAMINATE

| Electrical properties | Test results | |
|---|---|---|
| | Post cured | No post cure |
| Dielectric strength: | | |
| Parallel, kv | 48 | 42 |
| Perpendicular, VPM, 1/16 in | 475 | 480 |
| Dissipation factor (1 mc.) | 0.06 | 0.08 |
| Insulation resistance (megohms), 96 hr. at 95° F. and 90% RH | 160,000 | 150,000 |
| Dielectric constant (1 mc.) | 4.0 | 4.1 |
| Arc resistance (sec.) | 260 | 217 |
| PHYSICAL PROPERTIES | | |
| Tensile strength, p.s.i.: | | |
| Machine direction | 21,300 | 20,600 |
| Cross machine direction | 17,000 | 16,400 |
| Compressive strength, p.s.i | 47,000 | 46,400 |
| Flexural strength, p.s.i.: | | |
| Machine direction | 28,900 | 25,500 |
| Cross machine direction | 23,000 | 20,000 |

It is therefore seen from the foregoing examples that particularly advantageous results are obtainable when a porous absorptive pad, such as an asbestos pad, is used in place of metal caul plates. Asbestos pads, which encompass the preferred embodiment, may be obtained which are extremely uniform in thickness and fiber distribution and, consequently, of suitable resistance to compression at high temperatures and pressures thereby producing satisfactory surface flatness and caliper uniformity. The pads may be made of asbestos sheets as in the above examples or of asbestos "boards" so as to lessen the number needed.

The pads do at times have one deficiency in that they may not release satisfactorily from the laminate after pressing. This is due to the flow of the resin from the laminate to the pad and the inherent poor interlaminar strength of the pads. Consequently, it was found highly beneficial to place a layer of glass cloth between the porous pad and the laminate. It is sometimes desirable to place a thin metallic foil between the press and the pad since otherwise the pad may sometimes adhere to the press surface.

The instant invention is applicable to a wide variety of laminating and molding operations, but it is particularly suited to those employing condensation polymerization resins, e.g., silicones and phenolics. Examples of laminating or molding resins are Bakelite BV 17085, a phenol formaldehyde condensation product manufactured and sold by Union Carbon and Carbide Co., Melmac 405, a melamine formaldehyde manufactured by American Cyanamid Co. under that trademark, and silicones such as those discussed in the above examples. The resins may be combined with a variety of reinforcing media, e.g., glass asbestos, etc., in a variety of forms, e.g., paper, millboard, etc.

By laminating resin or molding resin, it is meant a resin system which will cross link under heat and pressure, which may be suitably dispersed in the reinforcing or filler medium and which imparts desired properties to the finished article. The selection of the resin and operating conditions will be, of course, dependent on the desired product.

While the instant invention had as an object the providing of a method to alleviate or at least lessen extensive post curing, which object has been satisfied, certain resin systems because of their makeup may still require a degree of post treatment. However, it is significant to note that a substantial reduction in the time necessary to effect a final product may be achieved by utilizing the instant process with a considerable economical savings, not to mention the attainment of highly desirable physical properties in the products.

In order to properly understand this feature, the following explanation is beneficial.

Pressing of the Union Carbide R-640 resin laminates at 350° F. serves mainly to remove the majority of the volatiles already existing in the paper and saturants and effects very little cure of the resin. This resin in laminates thicker than $\frac{1}{16}$ inch cannot be cured at higher temperatures in the conventional presses without delamination and blistering. On the other hand, pressing of the Dow Corning resin (DC 2104) laminates at 575° F. not only serves to remove the initial volatiles, but effects a cure of the resin and removal of substantially all the volatiles resulting from the condensation mechanism. Consequently, when the ultimate application will require a product completely devoid of volatiles, only a relatively short post time in an oven at 400° F. functions to remove the remaining volatiles without delamination. Neverethless, acceptable products may be made without any post cure utilizing the instant invention.

Heretofore, the difference in the cure temperatures for the resins has been dictated by their composition, including the catalyst mechanism used, and the press apparatus commercially available. As a result of this, the R-640 laminate has had to have its cure completed by further treatment before it would withstand exposures at higher temperatures without excessive softening of the resin or subsequent delamination. The DC-2104 laminate, however, because it is capable of being pressed at 575° F. will withstand exposures at high temperatures without a post cure.

However, as seen above, utilizing the instant invention laminates may be manufactured much thicker than heretofore possible with any resins, and the amount of post cure necessary to make certain laminates has been significantly decreased. Even more remarkable is the fact that it is now possible to substantially eliminate post cure for certain thicknesses of laminates made at high temperatures. This last feature is particularly significant with regard to resins such as the Union Carbide R-640 which requires a catalyst to cure and could not heretofore be cured at high temperatures without blistering.

CONCLUSION

From the foregoing description it is seen that a new and useful laminating process is now available. Further, the process is capable of producing articles which are possessed of new and useful properties. By utilizing the porous pads and cloth release agents, laminates of condensation polymerization resins can be readily produced in thicknesses heretofore difficult to make and without expensive and time consuming additional treatment. Other advantages are realized as the need for expensive metal caul plates is eliminated, as well as the need for time consuming handling, repair and cleaning of the plates.

It is believed the above provides a complete description of the invention in such manner as to distinguish it from other inventions and from what is old, and provides a description of the best mode contemplated of carrying out the invention and thereby complies with the patent statutes.

I is to be understood that variations and modifications of the invention, as illustrated by specific examples herein, may be made without departing from the spirit of the invention. It is also to be understood that the scope of the invention is not to be interpreted as limited to the specific embodimens disclosed herein but only in accordance with the appended claims, when read in the light of the foregoing description.

What I claim is:

1. A method of high pressure curing a plurality of silicon resin impregnated asbestos paper laminates wherein said resin releases volatiles during curing, comprising positioning removable porous pads between adjacent laminates and adjacent at least one major outer surface of said laminates, wherein the minimum thickness of each pad varies directly with the thickness of the adjacent laminates according to the following arrangement:

| Laminate thickness, in. | Thickness of porous pads, mils |
|---|---|
| $\frac{1}{32}$ | 60 |
| $\frac{1}{16}$ | 75 |
| $\frac{1}{8}$ | 90 |
| $\frac{1}{4}$ | 105 |
| $\frac{3}{8}$ | 120 |

2. A method of curing a plurality of laminates, containing resin which releases volatiles during curing comprising, providing silicone resin impregnated asbestos paper laminates containing about 45% to about 50% resin by weight of the paper, said paper having initially a bulk greater than 0.30, positioning removable porous pads between adjacent laminates and adjacent an outer surface of at least one of the outermost laminates, said porous pads being flexible and gas permeable under high pressure and resin flow conditions, wherein the approximate thicknesses in mils of said pads vary in relation to the approximate minimum thickness of the adjacent laminates according to the following arrangement:

| Adjacent laminate thickness, inch | 1/32 | 1/16 | 1/8 | 1/4 | 3/8 |
|---|---|---|---|---|---|
| | \multicolumn{5}{l}{Pad thickness, mils} | | | | |
| 1/32 | 90 | 105 | 120 | 120 | 135 |
| 1/16 | 105 | 120 | 135 | 135 | 150 |
| 1/8 | 120 | 135 | 135 | 150 | 165 |
| 1/4 | 120 | 135 | 150 | 150 | 165 |
| 3/8 | 135 | 150 | 165 | 165 | 180 | subjecting said combination to pressure and temperature laminating conditions whereby the silicone resin is advanced to a final cure stage, and thereafter separating said porous pads from said laminates.

3. A method as defined in claim 2, wherein said porous pads are asbestos paper.

References Cited by the Examiner
UNITED STATES PATENTS

| | | | |
|---|---|---|---|
| 1,864,812 | 6/1932 | Elmendorf | 156—288 |
| 2,364,616 | 12/1944 | Boeddinghaus | 156—288 |
| 2,442,422 | 6/1948 | Loetscher | 156—288 |
| 2,454,218 | 11/1948 | Schulman | 154—2.6 |
| 2,478,165 | 8/1949 | Collins. | |
| 2,546,474 | 3/1951 | Peyrot et al. | 161—205 X |
| 2,713,378 | 7/1955 | Nadler et al. | 156—580 |
| 2,801,198 | 7/1957 | Morris et al. | 154—13 |
| 2,931,746 | 4/1960 | Robitschek et al. | 154—43 |

FOREIGN PATENTS 715,951   9/1954   Great Britain.

OTHER REFERENCES

Meals, R. N. et al.: "Silicones," Reinhold Publishing Corp., N.Y., 1959 (pp. 137, 138, and 175).

ALEXANDER WYMAN, *Primary Examiner.*

CARL F. KRAFFT, EARL M. BERGERT, *Examiners.*